(12) United States Patent
Lentini (10) Patent No.: US 7,971,236 B1
(45) Date of Patent: Jun. 28, 2011

(54) METHOD AND SYSTEM FOR SECURE REMOTE DIRECT MEMORY ACCESS

(75) Inventor: James Lentini, Woburn, MA (US)

(73) Assignee: NetApp, Inc., Sunnyvale, CA (US)

( * ) Notice: Subject to any disclaimer, the term of this patent is extended or adjusted under 35 U.S.C. 154(b) by 472 days.

(21) Appl. No.: 12/260,950

(22) Filed: Oct. 29, 2008

(51) Int. Cl.
G06F 7/04 (2006.01)
G06F 15/16 (2006.01)
G06F 17/30 (2006.01)
H04L 29/06 (2006.01)

(52) U.S. Cl. .......................................................... 726/6

(58) Field of Classification Search ....................... 726/6
See application file for complete search history.

(56) References Cited

U.S. PATENT DOCUMENTS

| 5,949,883 | A * | 9/1999 | Ford .............................. 380/28 |
| 6,938,138 | B2 * | 8/2005 | Beukema et al. ............. 711/163 |
| 7,475,153 | B2 * | 1/2009 | Hufferd ........................ 709/230 |
| 2006/0013251 | A1 * | 1/2006 | Hufferd ........................ 370/466 |
| 2006/0047771 | A1 * | 3/2006 | Blackmore et al. ........... 709/209 |
| 2008/0022395 | A1 * | 1/2008 | Holtzman et al. .............. 726/19 |
| 2009/0106771 | A1 * | 4/2009 | Benner et al. ................. 719/313 |

OTHER PUBLICATIONS

Jeff Hilland et al.; "RDMA Protocol Verbs Specification (Version 1.0)"; Apr. 2003.
R. Recio et al.; "An RDMA Protocol Specification (Version 1.0)"; Oct. 2002.
Mike Ko; "Technical Overview of iSCSI Extensions for RDMA (iSER) & Datamover Architecture for iSCSI (DA)"; RDMA Consortium; Jul. 21, 2003.
Renato Recio; "RDMA enabled NIC (RNIC) Verbs Overview"; Apr. 29, 2003.
"Virtual Interface Architecture Specification"; Version 1.0; Dec. 16, 1997.
S. Bailey et al.; "The Architecture of Direct Data Placement (DDP) and Remote Direct Memory Access (RDMA) on Internet Protocols"; Dec. 2005; The Internet Society.

* cited by examiner

Primary Examiner — Carl Colin
Assistant Examiner — Dao Ho
(74) Attorney, Agent, or Firm — Klein, O'Neill & Singh, LLP (57) ABSTRACT

Method and system are provided where a memory key structure is used for authenticating access to a memory location that is registered for a remote direct memory access (RDMA) operation. The memory key structure not only includes a standard memory key that is expected by an RDMA enabled network interface card (RNIC), but also includes an endpoint network address identifier and a transport identifier. The endpoint network address identifier and the transport identifier are verified before an entity is granted access to the registered memory location.

21 Claims, 4 Drawing Sheets

METHOD AND SYSTEM FOR SECURE REMOTE DIRECT MEMORY ACCESS

BACKGROUND

1. Technical Field

The present disclosure relates to direct remote memory access in network communication.

2. Related Art

Network communication is commonly used by computing systems and devices to send and receive information. Typically, a computing system uses a network interface card send and receive information. Continuous efforts are being made to improve the efficiency at which information is sent and received.

One option for improving network communication is to use remote direct memory access ("RDMA"). RDMA allows data to move directly from one computing system memory to another computing system memory, without extensively involving either computing system's operating system. Various specifications for RDMA based communication have been established by various organizations, for example, the RDMA Consortium, InfiniBand Trade Association (IBTA) and Internet Engineering Task Force (IETF). The specifications provide guidelines for remote direct memory access.

For executing RDMA operations, typically, a portion of a computing system's memory is registered so that another device (for example, a network interface card) can directly place information to or read information from the registered memory. During the registration process, a memory key is generated. Before a remote node is allowed to access the registered memory, the network interface card verifies the remote memory key. However, this level of authentication is not very strong and may raise security issues. For example, an unauthorized person may run an unauthorized program on computing system and obtain access to the memory keys by guessing, searching or using any other technique. Once the memory key is compromised, one can potentially access the registered memory. This problem can be serious, especially, with the rampant popularity of Internet based communication.

Therefore, it is desirable to provide a method and system for secure RDMA communication that does not rely solely on standard memory key verification.

SUMMARY

In one embodiment, a process and system is provided where a memory key structure is used for authenticating access to a memory location that is registered for a remote direct memory access (RDMA) operation in a network. The memory key structure not only includes a memory key that is expected by a RDMA enabled network interface card (RNIC), but also includes an endpoint network address identifier and an endpoint transport identifier (may also be referred to as a "transport identifier")).

The endpoint network address identifier is a unique value that is used by a network layer of a networking protocol stack for enabling network communication. An example of the endpoint network address identifier is the Internet Protocol (IP) address used by the Internet Protocol; and LIDS (Local Identifiers) or GIDs (Global Identifier) used in InfiniBand (IB) networks.

The endpoint transport identifier is a unique value used by a transport layer to differentiate between network connections. For example, a port number in (Transmission Control Protocol) communication and a QPN (Queue Pair Number) used by the IB protocol are endpoint transport identifiers.

Both the endpoint address identifier and the endpoint transport identifier are verified, before an entity is granted access to the registered memory location.

Because of the additional verification of the endpoint address identifier and the transport identifier, an unauthorized entity that may have obtained access to the standard memory key, is unable to access the registered memory location.

In another embodiment, the standard memory key included in the memory key structure is generated by a random number generator. Because the memory key values are randomly generated, it is difficult to guess or search for the memory keys.

In yet another embodiment, a method for a remote direct memory access ("RDMA") operation between a first network node and a second network node is provided. The method includes receiving a request to access a memory location registered by the first network node for the RDMA operation; verifying if the request access the registered memory location at least includes a valid memory key value, and includes at least a valid endpoint network address identifier and valid transport identifier; and upon verification of the request, granting access to the registered memory location for executing the RDMA operation.

In another embodiment, the size of the memory key is optimized to prevent easy access by an unauthorized entity, attempting to guess or search for the memory key values. The size of the memory key is such that an unauthorized entity may have search for a longer duration. The longer duration may cause the unauthorized entity to give up the search or be discovered by an authorized entity (for example, a network administrator) monitoring the network.

In another embodiment, a method for a remote direct memory access ("RDMA") operation between first network node and a second network node is provided. The method includes generating a structure for authenticating a request to access a memory location registered by network node for the RDMA operation, wherein the structure includes a memory key value, an endpoint network address identifier and a transport identifier; verifying if the request to access the registered memory location includes the endpoint network address identifier and the transport identifier; wherein a plurality of fields within the structure are used to authenticate the request; and upon verification of the request, granting access to the registered memory location executing the RDMA operation.

In another embodiment, a method for a remote direct memory access ("RDMA") operation between a first network node and second network node is provided. The method includes generating a structure for authenticating a request to access a memory location registered by the first network node for the RDMA operation, wherein the structure includes a memory key value, an endpoint network address identifier and a transport identifier; and wherein the memory key value is of a size, "b" that is determined by relationship between a time, "t", that it takes to each memory key; a time "s", that an unauthorized entity has to search for the memory key before the unauthorized entity gives up the search or is discovered by an authorized entity, and "x" is a portion of a key space that the authorized entity is willing to allow the unauthorized entity to search; verifying if request to access the registered memory location includes the endpoint network address identifier and the transport identifier; wherein a plurality of fields within the structure are used to authenticate the request; and upon verification of request, granting access to the registered memory location for executing the RDMA operation.

In yet another embodiment, a system for performing remote direct memory access ("RDMA") operation is provided. The system includes: a first network node having a processor and a memory with a portion of the memory being registered for the RDMA operation; and a second network node communicating with the first network node; wherein memory registration by the first network node includes generating a structure for authenticating a request to access the registered memory location; wherein the structure includes a memory key value, an endpoint network address identifier and a transport identifier; and for executing the RDMA operation and before a request to access the registered memory location is granted, the endpoint address identifier and the transport address identifier are verified.

In another embodiment, a computer program product having a computer usable storage medium having computer readable code embodied therein for performing a remote direct memory access ("RDMA") operation between a first network node and a second network node is provided. The computer program product including: (a) code for generating a structure for authenticating a request to access memory location registered by the first network node for the RDMA operation, wherein the structure includes a memory key value, an endpoint network address identifier and a transport identifier; (b) code for verifying if the request to access the registered memory location includes the endpoint network address identifier and the transport identifier; wherein a plurality of fields within the structure are used to authenticate the request; and (c) upon verification of the request, code for granting access to the registered memory location for executing the RDMA operation.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

The following definitions are provided as they are typically (but not exclusively) used in the networking environment, implementing the various adaptive embodiment described herein.

"DDP" means the Direct Data Placement pro originally published by the RDMA consortium and now published by IETF. The DDP protocol allows data to be placed directly into assigned memory buffers using network protocols, for example, TCP/IP and others. The use of the DDP protocol is described in the RDMA Protocol Specification, mentioned below, which is incorporated herein by reference in its entirety.

"InfiniBand" (also referred to as IB) is an industry standard used with computing systems and input/output (I/O) devices. IB is used to create fabrics that are complex networks, which may encompass hundreds and even thousands of interconnected hosts/switches/servers, all working in parallel to solve complex problems. The IB Specification is published by the InfiniBand Trade Association ("IBTA) and is incorporated herein by reference in its entirety. The IB Architecture Specification, Volume 1, Release 1.2.1 published by the IBTA provides support RDMA operations. The specification is incorporated herein by reference in its entirety.

"iWARP" means the Internet Wide Area RDMA Protocol as defined by the Internet Engineering Task Force (IETF). iWARP includes a collection of three protocols for enabling RDMA based operations over TCP networks. These protocols are MPA (Marker Protocol Data Unit Aligned Framing for TCP), Direct Data Placement (DDP), and the RDMA Protocol (RDMAP). The iWARP Protocol specifications, originally published by the RDMA consortium, are now published by the IETF and are incorporated herein by reference in their entirety.

"RDMAP" means the standard Remote Direct Memory Access Protocol described in the RDMA Protocol Specification, version 1.0, originally published by the RDMA consortium, incorporated herein by reference in its entirety. The RDMA Protocol Specification is now published by the IETF and is incorporated herein by reference in its entirety. The RDMA protocol specification describes how the RDMA protocol operates to read and write information directly from memory buffers assigned to Upper Level Applications (ULPs).

"RNIC" means a network interface card that is enabled to handle RDMA operations. In IB networks, the RNIC may called a host channel adapter, while in Fibre Channel networks, the RNIC may be referred to as a host bus adapter.

"TCP/IP" means the standard Transmission Control Protocol/Internet Protocol, commonly used for network and Internet communication. The TCP/IP protocols are incorporated herein by reference in their entirety.

"VIA" means Virtual Interface Architecture, an abstract model of a user-level, zero-copy network and is described in the VIA Specification, incorporated herein by reference in its entirety.

As used in this disclosure, the terms "component" "module", "system," and the like are intended to refer to computer-related entity, either software, hardware, a combination of hardware and software, or software in execution. For example, a component may be, but is not limited to being, a process running on a processor, processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other device, in accordance with the claimed subject matter.

Figure 1A:
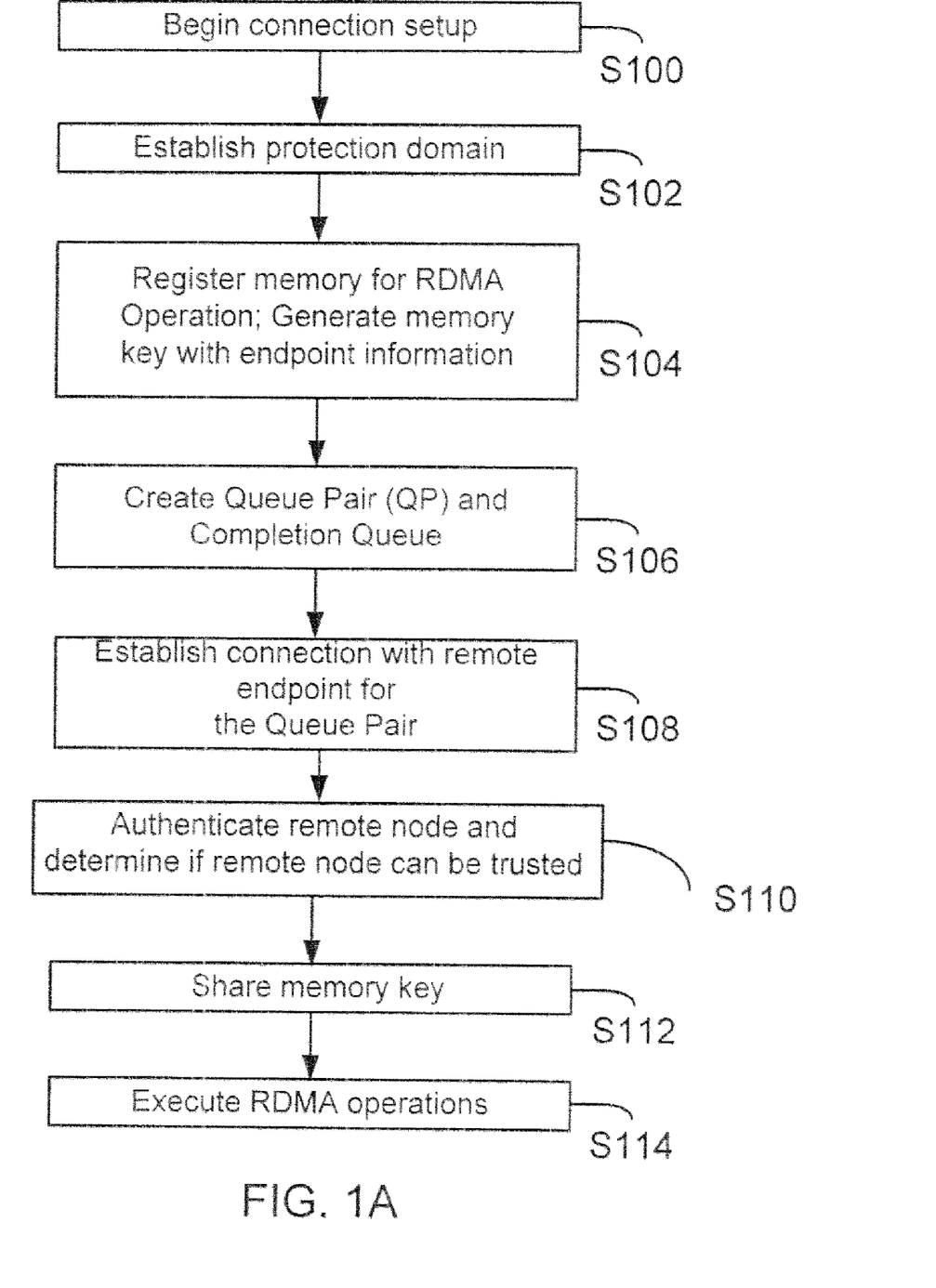
FIGS. 1A and 1B show process flow diagrams according to one embodiment of the present disclosure.
Figure 1B:
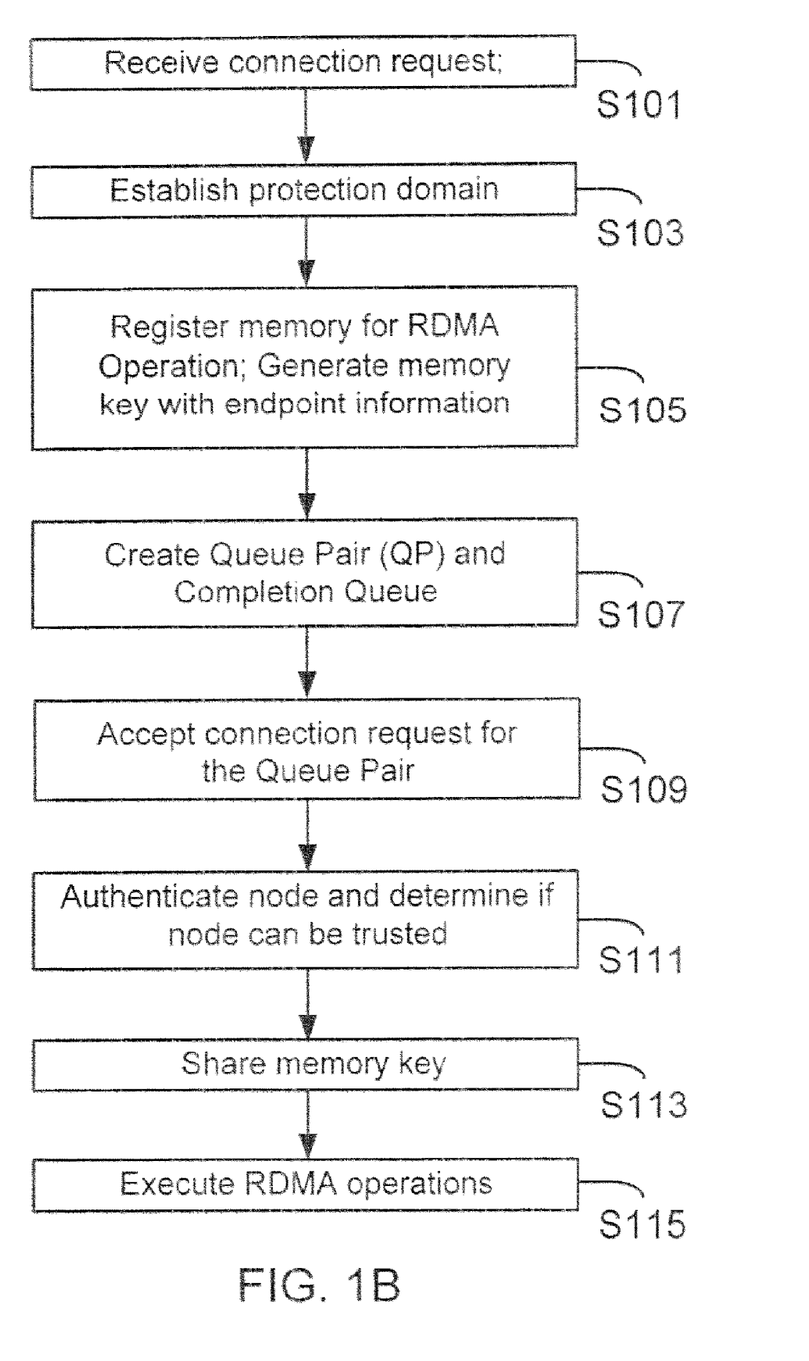

Process Flow Diagram:

FIGS. 1A and 1B show process flow diagrams for securely performing RDMA based operations between a first network node and a second network node according to one embodiment. For executing RDMA operations, the first network node may operate as an initiator and the second network node may operate as a target. The term network node may generically be referred to as a "node", "computing system", "host", "host computing system", "initiator" or target". In one embodiment, one or both of the network nodes may be a computing system.

Using a network interface card, the initiator initiates a connection with the target, while the target, typically, accepts the connection. FIG. 1A process flow diagram shows process steps executed by an initiator, while FIG. 1B shows process steps executed by a target.

Both the nodes include a RNIC to support RDMA operations defined by the RDMA protocol. The RNIC may enable a RDMA send, RDMA read and RDMA write operation using the RDMA send, RDMA read, and RDMA write primitives that are also defined by the RDMA protocol. For example, an RDMA send operation transfers data from a memory buffer at a network node (for example, the first network node) to a memory buffer at a target network node (for example, the second network node). The memory buffer at the second network node is not advertised by the second network node. An RDMA read operation requests transfer (read) of information from a memory buffer at the second network node directly to a memory buffer at the network node. An RDMA write operation transfers data from a memory buffer at the first network node directly to a memory buffer the second network node. Unlike the RDMA send operation, the memory buffer at the second network node, for the RDMA Write operation is advertised for an RDMA operation.

Referring now to FIG. 1A, the process begins in block S100, when a network node (for example, a computing system with an RNIC operating as an initiator) begins a network connection setup with another node (for example, a target node).

In block S102, a protection domain (PD) is created. The PD is a standard way to associate Memory Regions (described below) with Queue Pairs (QPs). The term QP as used herein includes a structure that maintains a send queue and a receive queue for managing work requests, described in detail below with respect to FIG. 3. A PD is typically represented by a unique identifier. The standard use of a PD is described in Section 5.2 of the RDMA Verb Specification, Version 1.0, and Published by the RDMA consortium on Apr. 25th, 2003, incorporated herein reference in its entirety.

After creating the PD, memory registration takes place in block S104. The memory registration process is to enable direct RNIC access to pre-defined memory locations. The network node registers one or more memory locations (may also be called buffers or memory buffers) with the RNIC so that the RNIC can directly place information to or access information from the registered memory location. Typically, an operating system of the network node registers the memory locations as defined by the RDMA protocol. A registered memory location, directly accessible to a RNIC may be referred to herein as a "Memory Region".

During memory registration, in one embodiment, a memory key structure (may also be referred to "structure") is also generated. The memory key structure includes a standard memory key that is typically used by conventional systems for authenticating access to a Memory Region. The standard memory key format/value may depend on the type of network protocol. For example, the standard memory key structure and type may vary if VIA, IB, iWARP or any other protocol is being used in conjunction with RDMA protocol.

It is noteworthy that the adaptive embodiments described herein are not limited to any particular network protocol or standard memory key configuration.

In conventional systems, before a RNIC can place information directly to a Memory Region, the standard memory key is checked. Once the memory key is verified, access to the Memory Region is granted. This level of authentication is weak because if an unauthorized entity (referred to herein as an attacker (see FIG. 2)) gains access to the standard memory key, by guessing, searching or any other means, then the attacker may be able to access the Memory Region to read and write information.

The embodiments described herein, attempt to reduce the risk of such unauthorized access. Instead of only using the standard memory key to authenticate Memory Region access, a new RDMA verb is defined so that an extra layer of security can be provided before data is read or written to a Memory Region. The RDMA verb (or memory key structure shown in FIG. 4) may include (i) an identifier to identify key type (i.e. memory key), (ii) a standard memory key value (which may depend on the network protocol), (iii) a network address (also referred to as endpoint network address identifier) of an endpoint (or network node) that is being granted permission to use the standard memory key and hence, access the Memory Region; and (iv) an endpoint transport identifier (may also be referred to as "transport identifier").

Figure 4:
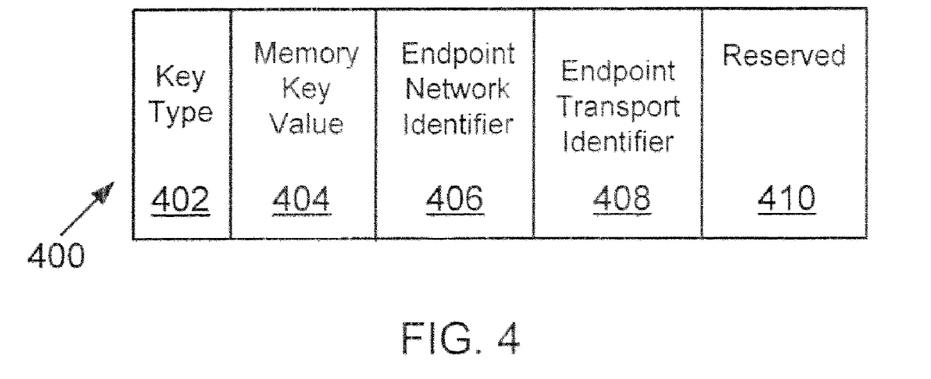
FIG. 4 shows an example of a structure with a memory key for securing RDMA based operations, according to one embodiment.

The endpoint network address identifier may be a unique network address for an endpoint that is used by a network layer of a networking protocol stack for enabling network communication. Most network communication use a layered protocol structure. An example a networking protocol stack is the Open Systems Interconnect (OSI) model that has several layers, including a network layer. An example of a network layer is the Internet Protocol layer. An example of an endpoint network address identifier is the IP address used by the Internet Protocol; and LIDs (Local Identifiers) or GIDs (Global Identifier) used protocol.

The endpoint transport identifier is a unique value used by a transport layer of a network protocol stack to differentiate between network connections. An example of transport layer is the TOP layer. An example of an endpoint transport identifier is a port number in TOP communication; and a QPN (Queue Pair Number) used in IB networks.

This new RDMA verb adds additional authentication before access to a Memory Region is granted. When a RDMA packet header includes a key value, the RNIC would double check the node from where the packet originated to determine if the node has permission associated with the memory key structure.

In another embodiment, the memory key may be generated by a random number generator (220 and 234, FIG. 2) so that is makes it harder for an attacker to access/guess the standard memory key.

In yet another embodiment, the size of the memory key is such that if an attacker attempts to obtain the memory key, because the key is of a certain size, it would take the attacker longer to gain access to the key. This may cause the attacker to give up the search; or while the attacker is attempting to gain access, a network administrator (or authorized entity) may be able to discover the attacker's unauthorized attempt to gain access to the memory key.

In one embodiment, the owing formula may be used to determine the size of the memory key:

$$b \geq lg_2 \frac{s}{t \cdot x}$$

In the foregoing formula, b is the size of the memory key, t is a duration to test each memory key, s is a duration an attacker will have to search for the valid memory key (either because the attacker will give up or some amount of time or be discovered), and x is a percentage of a key space (i.e. total memory space allocated to memory keys) a network administrator (authorized entity) is willing to allow the attacker search (e.g. 50% of the space).

This formula is derived from the fact that $$\frac{s}{t} =$$

the number of key values tested during a search and therefore $2^b \cdot x \cdot t \geq s$ As an example, suppose that t=30 μs, x=1%=0.01, and s=30 days. Then b should ter than 43 bits.

After the memory registration and generation of the memory key structure, as described above, a QP and a completion queue (as described below) is created in step S106 (See FIG. 3). The QP pairs are used in the RDMA protocol for monitoring and processing work requests from a network node. The work requests are typically used for performing an RDMA operation (for example, RDMA Send, RDMA Read or RDMA Write operation). The creation and handling of QPs are described in detail in the RDMA VERB specifications mentioned above.

A completion queue is a structure that maintains a status of various work requests for RDMA operations, at any given time. The completion queue is provided so a network node can determine the status of work requests, at any given time. When the network node completes a work request, the network node updates the completion queue to indicate that the work request has been completed. In one embodiment, a flag in the completion queue may be set to indicate work request completion.

After, the QP and completion queue is created, in block S108, a connection is established for the QP.

In block S110, the remote node is authenticated. The authentication involves verifying that the remote endpoint is the same network node specified the memory key structure's end-point structure created in block S104.

In block S112, the memory key is shared with the other node and in block S114, a RDMA operation is conducted using the Memory Region, if applicable.

In one embodiment, because an attacker will typically guess or acquire information regarding a standard memory key to access memory locations, the use of an enhanced memory key structure with endpoint network and transport identifier may reduce the risk of unauthorized access.

FIG. 1B shows the process flow diagram from a target node's perspective. The target node typically accepts a connection request, instead of initiating a connection request. The target node typically continuously "listens" for connection requests. In block S101, the target receives a connection request.

Blocks S103, S105 and S107 are similar to blocks S102, S104 and S106 that are described above with respect to FIG. 1A.

In block S109, the target node accepts the connection request that is received in block S101. Blocks S111, S113 and S115 are similar to blocks S110, S112 and S114, described above with respect to FIG. 1A.

Figure 2:
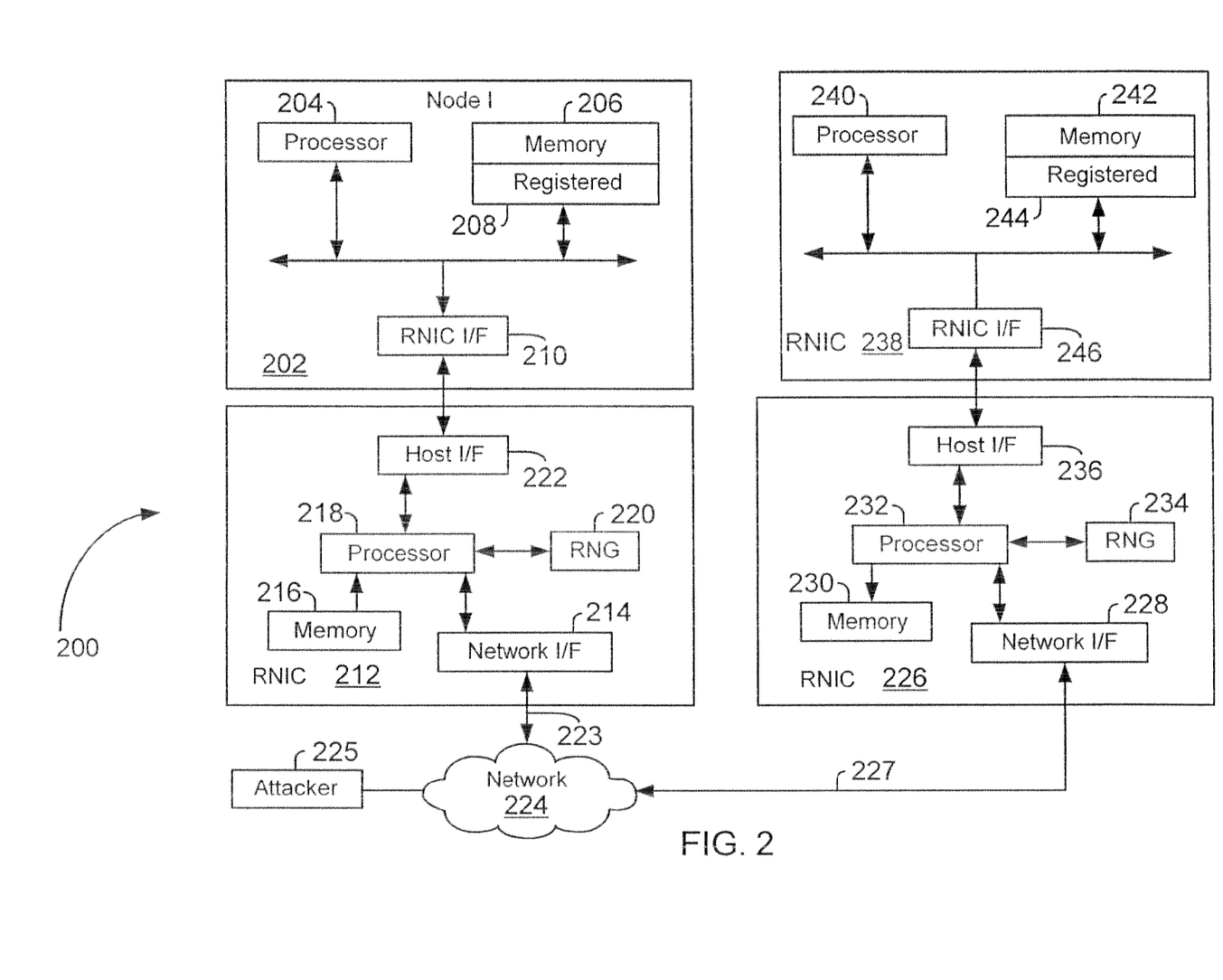
FIG. 2 shows a block diagram of a system using methodology according to one embodiment of the present disclosure.

System:

To facilitate an understanding of the various embodiments of the present disclosure, the general architecture and operation of a RDMA system will now be described. FIG. 2 is a block diagram of a system 200 for enabling the embodiments of the present disclosure. System 200 includes two network nodes, 202 and 238. Each node includes a processor (for example, micro-processor), 204 and 240, respectively. Processor 204 has access to memory 206, while processor 240 has access to memory 242.

Each processor may use a certain memory segment as a memory region (shown as registered memory 208 and registered memory 244) RDMA operations. Each node may also include a RNIC interface 210 and 246 to interface with RNICs 212 and 226, respectively.

RNIC 212 may include a processor 218 (for example, a RISC (reduced instruction set computer) processor) with access to memory 216. Processor 218 executes firmware instructions to control overall RNIC operations, as described below. Memory 216 is also used to store Queue Pairs and Completion Queues, as described below.

RNIC 212 includes a network interface 214 that interfaces with network 224 via network link 223. The structure of network interface may depend on the type of network 224. For example, if network 224 is IB, iWARP, or VIA based, then network interface 214 includes logic and circuitry to handle such protocol based communication.

RNIC 212 may also include a host interface 222 to interface with node 202. The structure of host interface 222 depends on the structure of interconnect between host interface 222 and node 202. For example, if a PCI-X/PCI-Express bus is used to operationally engage RNIC 212 with node 202, then host interface 222 is a X/PCI-Express interface. Both PCI-X and PCI-Express are well known, bus standards and are incorporated herein by reference in their entirety.

RNIC 212 also includes a random generator (shown as RNG) 220 for generating a random memory key, according one embodiment. The size of the memory key may be based on the formula described above i.e.

$$b \geq lg_2 \frac{s}{t \cdot x}.$$

RNIC 226 is similar to RNIC 212. Processor 232 is similar to processor 218, memory 230 is similar to memory 216, host interface 236 is similar to host interface 222 and network interface 228 (using network link 227) is similar to network interface 214. Furthermore, RNG 234 is similar to RNG 220.

In one embodiment, one or both of nodes 202 and 238 may be a network storage system (which includes a storage server and generically may also be referred to as a storage server) that may be advantageously used with the various embodiments disclosed herein. The storage system may include an operating system (not shown) that implements a file system to logically organize the information as hierarchical structure of directories and files on storage disks (not shown) or any other type of storage media, including non-volatile memory (may also be referred to as flash memory).

The storage system includes a special-purpose computing system that provides various services relating to the organization of information on storage devices, for example, storage disks, flash memory or any other type storage device. However, it will be understood to those skilled in the art that the inventive embodiments described herein may apply to any type of special-purpose (e.g., server) or general-purpose computer, including a standalone computer.

In one embodiment, the storage system may have a distributed architecture. For example, the storage system may include a storage server that can be implemented with multiple distributed storage servers. It can also include a physically separate network module (e.g., "N-module") and disk module (e.g., "D-module") shown), which communicate with other storage servers over an external interconnect. The N-module acts as a front-end of the storage server, exporting services to clients, and the D-module acts as the back-end, managing the underlying storage of the storage server. The N-module and D-module can be contained in separate housings and communicate with each other via network connections. Thus, the N-module and D-module enable a server to be physically separated into multiple modules that can be distributed across a network.

Figure 3:
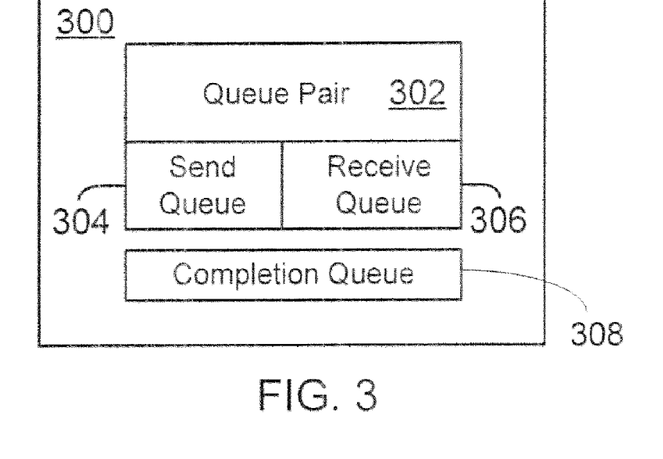
FIG. 3 shows a block diagram of a Queue Pair and a Completion Queue used according to one embodiment

FIG. 3 shows a block diagram 300 with a QP 302 and completion queue 308. QP 302 includes a send queue 304 and a receive queue 306. The send queue 304 stores work requests for information that are sent by the RNIC. The receive queue 306 stores work requests for receiving information. When a work request is completed, the completion queue 308 is updated to notify the entity that generated the work request. In one embodiment, QP 302 and completion queue 308 are set up in RNIC memory, for example, 216.

FIG. 4 shows a block diagram of a structure 400 (also referred to as memory key structure 400), according to one embodiment. Memory key structure 400 is used to authenticate RDMA operations involving Memory Regions.

Memory key 400 includes a field 402 to identify the key type and a valid standard memory key value 404. The standard memory key value may depend on the type of network protocol. For example, the following Tables show the various standard memory key types that may be used with the adaptive embodiments:

TABLE 1

VIA Keys

| Standard Memory Key (404) | Size (bits) |
|---|---|
| Memory Handle | 32 |

TABLE 2

InfiniBand Keys

| Standard Memory Keys (404) | Size (bits) |
|---|---|
| Management Key (M_Key) | 64 |
| Baseboard Management Key (B_Key) | 64 |
| Partition Key (P_Key) | 16 |
| Queue Key (Q_Key) | 32 |
| Memory Keys (L_Key and R_Key) | 32 |

TABLE 3 iWARP Keys

| Standard Memory Key (404) | Size (bits) |
|---|---|
| Steering Tag (STaq) | 32 |

The use of the foregoing keys is described in the applicable standards.

Besides the standard memory key 404, the embodiments disclosed herein also use a valid endpoint network address 406 and a valid endpoint transport identifier 408. Identifiers 406 and 408 are used in addition to the standard memory key 404 verification, before access to a Memory Region is granted.

Figure 5:
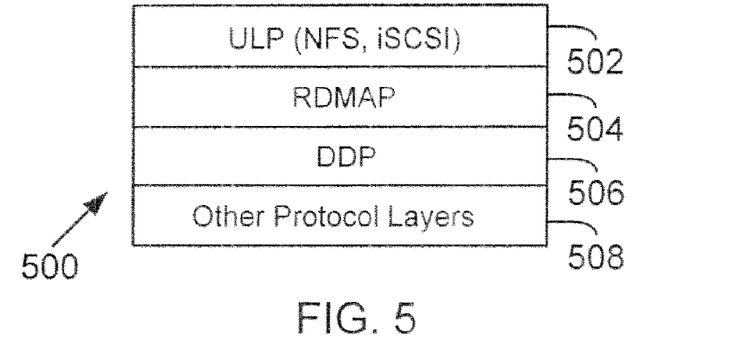
FIG. 5 shows an example of a layered structure for enabling RDMA operations.

FIG. 5 shows an example of a generic layered protocol structure 500 for enabling RDMA operations. A TAP (Upper Layer Protocol) layer 502 sits on the RDMAP layer 504 (also referred to as RDMA layer 504). The ULP layer 502 may include various applications, for example, network File System (NFS), iSCSI based applications and others). The RDMA layer 504 interfaces with the DDP layer 506. Depending on the network type and configuration, various other layers 508 may operate below the DDP layer. The various other layers may include MPA, TCP and others.

It is noteworthy structure 500 may vary depending on the type of network/protocol that is used for performing RDMA operations. For example, structure 500 in IB networks may be different from structure 500 described above.

The embodiments disclosed herein assist in securing RDMA operations. For example, by having to verify endpoint address identifiers and transport identifiers in addition to the standard memory key verification; one can thwart an attacker's attempt to gain access to a Memory Region. Furthermore, because a memory key value may be randomly generated and may be of a size that may take an attacker longer to search/guess, the attacker may give up the unauthorized search to obtain the memory key or get discovered by a network administrator.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for a remote direct memory access ("RDMA") operation between a first network node and a second network node, comprising:

generating a structure for authenticating a request to access a memory location registered by the first network node for the RDMA operation, wherein the structure is generated by a processor of the first network node and includes a memory key value, an endpoint network address identifier and a transport identifier; and wherein the memory key value is of a size, "b", that is determined by a relationship between a time, "t", that it takes to test each memory key; a time "s", that an unauthorized entity has to search for the memory key before the unauthorized entity gives up the search or is discovered by an authorized entity, and a portion of a key space, "x" that the authorized entity is willing to allow the unauthorized entity to search;

verifying if the request to access the registered memory location includes the endpoint network address identifier and the transport identifier; wherein a plurality of fields within the structure are used to authenticate the request by the processor of the first node; and upon verification of the request, granting access to the registered memory location for executing the RDMA operation.

2. The method of claim 1, wherein the memory key value is generated randomly using a random number generator.

3. The method of claim 1, wherein the first network node is a computing system with a RDMA enabled network interface card that can access the registered memory location.

4. The method of claim 1, wherein one or both of the first network node and the second network node is a storage server.

5. The method of claim 1, wherein the first network node and the second network node operate within an InfiniBand network.

6. The method of claim 1, wherein the first network node and the second network node operate within a network using Virtual Interface Architecture (VIA).

7. The method of claim 1, wherein the first network node and the second network node operate within an Internet Wide Area RDMA Protocol (iWARP) network.

8. A system for performing a remote direct memory access ("RDMA") operation, comprising:

a first network node having a processor and a memory with a portion of the memory being registered for the RDMA operation; and a second network node having a processor and communicating with the first network node;

wherein memory registration by the processor of the first network node includes generating a structure for authenticating a request to access the registered memory location; wherein the structure includes a memory key value, an endpoint network address identifier and a transport identifier; wherein the memory key value is of a size, "b", that is determined by a relationship between a time, "t", that it takes to test each memory key; a time, "s", that an unauthorized entity has to search for the memory key before the unauthorized entity gives up the search or is discovered by an authorized entity, and a portion of a key space, "x" that the authorized entity is willing to allow the unauthorized entity to search; and wherein for executing the RDMA operation and before a request to access the registered memory location is granted by the processor of the first network node, the endpoint address identifier and the transport address identifier are verified.

9. The system of claim 8, wherein the memory key value is generated randomly using a random number generator.

10. The system of claim 8, wherein the first network node and the second network node operate within an InfiniBand network.

11. The system of claim 8, wherein the first network node and the second network node operate within a network using Virtual Interface Architecture (VIA).

12. The system of claim 8, wherein the first network node and the second network node operate within an Internet Wide Area RDMA Protocol (iWARP) network.

13. The system of claim 8, wherein one or both of the first network node and the second network node is a storage server that interfaces with the first network node.

14. A computer program product stored in a non-transitory computer usable storage medium having computer readable code embodied therein for performing a remote direct memory access ("RDMA") operation between a first network node and a second network node, comprising:

(a) code for generating a structure for authenticating a request to access a memory location registered by the first network node for the RDMA operation, wherein the structure is generated by a processor of the first node and includes a memory key value, an endpoint network address identifier and a transport identifier; and wherein the memory key value is of a size, "b", that is determined by a relationship between a time, "t", that it takes to test each memory key; a time "s" that an unauthorized entity has to search for the memory key before the unauthorized entity gives up the search or is discovered by an authorized entity, and a portion of key space "x" that the authorized entity is willing to allow the unauthorized entity to search;

(b) code for verifying if the request to access the registered memory location includes the endpoint network address identifier and the transport identifier; wherein a plurality of fields within the structure are used to authenticate the request by the processor of the first node; and (c) upon verification of the request, code for granting access to the registered memory location for executing the RDMA operation.

15. The computer program product of claim 14, wherein the memory key value is generated randomly using a random number generator.

16. The computer program product of claim 14, wherein the first network node is a computing system with a RDMA enabled network interface card that can access the registered memory location.

17. The computer program product of claim 14, wherein one or both of the first network node and the second network node is a storage server.

18. A machine implemented method for a remote direct memory access ("RDMA") operation between a first network node and a second network node, comprising:

receiving a request to access a memory location registered by the first network node for the RDMA operation;

verifying if the request to access the registered memory location at least includes a valid memory key value, and includes at least one or both of a valid endpoint network address identifier and a valid transport identifier; wherein the memory key value is of a size, "b", that is determined by a relationship between a time, "t", that it takes to test each memory key; a time "s" that an unauthorized entity has to search for the memory key before the unauthorized entity gives up the search or is discovered by an authorized entity, and a portion of a key space, "x", that the authorized entity is willing to allow the unauthorized entity to search; and upon verification of the request by a processor of the first node, granting access to the registered memory location for executing the RDMA operation.

19. The method of claim 18, wherein the memory key value is generated randomly using a random number generator.

20. The method of claim 18, wherein the first network node is a computing system with a RDMA enabled network interface card that can access the registered memory location.

21. The method of claim 18, wherein one or both of the first network node and the second network node is a storage server.

* * * * *